F. DE ROY.
GAGE AND HOLDER FOR SCALES.
APPLICATION FILED AUG. 18, 1915.

1,200,598.

Patented Oct. 10, 1916.

Witnesses:
Herman R. Hoffman.
Leonard A. Powell.

Inventor:
Frank De Roy,
By his attorney Charles N. Gooding.

UNITED STATES PATENT OFFICE.

FRANK DE ROY, OF WOONSOCKET, RHODE ISLAND.

GAGE AND HOLDER FOR SCALES.

1,200,598.  Specification of Letters Patent.  Patented Oct. 10, 1916.

Application filed August 18, 1915. Serial No. 46,198.

*To all whom it may concern:*

Be it known that I, FRANK DE ROY, a citizen of the United States, residing at Woonsocket, in the county of Providence and State of Rhode Island, have invented new and useful Improvements in Gages and Holders for Scales, of which the following is a specification.

This invention relates to improvements in gages and holders for scales.

The object of the invention is to provide a simple and convenient gage constructed and arranged to be moved longitudinally of a scale or rule for the purpose of taking the measurement of articles and in gaging depths of holes, said gage being adapted to be clamped in any predetermined position on said scale to preserve, for future reference, the measurements secured.

Another object of the invention is to provide means for attaching the gage together with the scale held therein to the edge of a coat pocket so as to prevent the same from dropping therefrom or being lost when the person carrying it stoops.

The invention consists in the combination and arrangement of parts set forth in the following specification and particularly pointed out in the claims.

Figure 1:
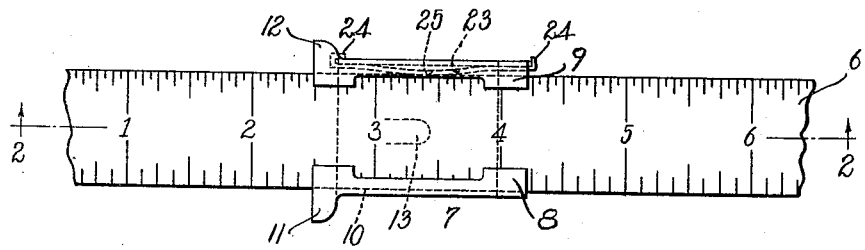
Figure 2:
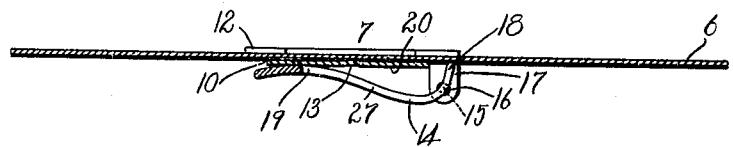
Figure 3:
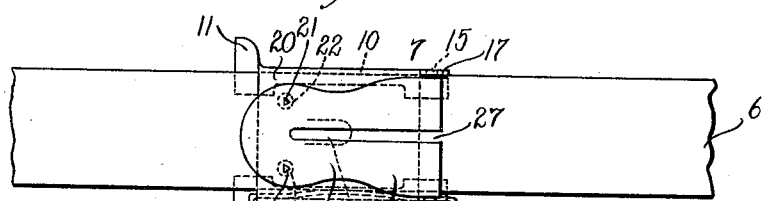
Figure 5:
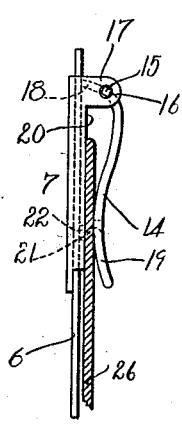
Figure 4:
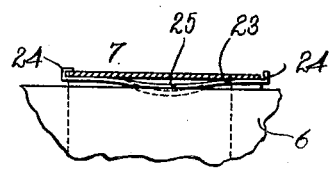

Referring to the drawings: Figure 1 is a side elevation of a portion of a scale with a gage and holder embodying my invention shown in connection therewith. Fig. 2 is a longitudinal section taken on the line 2—2 of Fig. 1, parts of said device being shown in elevation. Fig. 3 is a rear elevation of the scale and gage. Fig. 4 is a detail section illustrating the means for positioning a scale transversely of the gage. Fig. 5 is an edge view of the gage and holder attached to the edge of a coat pocket.

Like numerals refer to like parts throughout the several views of the drawings.

In the drawings, 6 is a scale of a well known type constructed preferably of steel. A movable member or slide 7 is mounted to move longitudinally of said scale 6, said slide being preferably constructed of sheet material, such as metal, bent at its opposite edges, which edges are turned inwardly toward each other at 8 and 9, to form grooves 10 adapted to receive the opposite edges of the scale 6. Said bent portions 8 and 9 are arranged upon the side of the scale which is provided in the usual manner with graduations indicating distances, said bent portions being furthermore cut away so as not to obscure said graduations.

The slide 7 is provided at one end thereof with projections 11 and 12 projecting laterally from adjacent opposite edges of said scale and constructed and arranged to coöperate with the graduations which are provided at the opposite edges of said scale to determine distances. The slide 7 is further provided with a frictional device consisting of a tongue 13, preferably formed by partially detaching portions of the material constituting the slide 7 and bending the same inwardly so as to engage the back side of the scale arranged within the grooves 10. Said tongue prevents said slide from being moved too easily longitudinally of the scale. Means are also provided for securely clamping said gage in any predetermined position on said scale, said means preferably consisting of a clamping member or lever 14, formed preferably from sheet metal, with projections 15 projecting laterally in opposite directions and arranged to fit into holes 16 formed in a pair of ears 17 which are preferably formed integral with the slide 7 by partially detaching portions of the material constituting said slide and bending the same laterally with respect to the back side of the scale. The projections 15 are arranged at a distance from one end 18 of said clamping member 14, said distance being substantially equal to the distance of the holes 16 from the back face of said scale so as to permit said end 18 to be swung inwardly against said scale in substantially a perpendicular position, thus firmly binding said scale to the slide. The opposite end 19 of the clamping member constitutes a handle whereby the same may be moved pivotally between said ears 17 to clamp or release the scale from the slide. In its clamped position the handle portion 19 of said clamping member is adapted to rest against the body portion 20 of said slide with the portion 18 of said clamping member approximately at right angles to the scale, but arranged upon the opposite side of a plane disposed transversely of and at right angles to the rear face of said scale and containing the axis of said clamping member, from the handle portion of said clamping member. The handle portion 19 is furthermore slightly curved outwardly at its outer end to permit said lever to be more easily moved from one position to another. A pair of spurs 21, 21 are formed by partially detaching portions of the material constituting the handle 19 by bending said partially detached portions inwardly toward the body portion 20 of said slide, said body portion being perforated at 22, 22 to provide clearance for said spurs. The purpose of said spurs is to pierce or grip the edge of a piece of sheet material such as the edge 26 of the pocket of a coat in order to secure said gage thereto and prevent said gage and scale from dropping from the pocket when the wearer of the coat containing said pocket stoops and to prevent said scale and gage from being accidentally dislodged from the coat pocket.

The slide 7 is constructed to take scales of different widths and when a scale is arranged therein which is not wide enough to extend from one side of said gage to the other it is essential that said gage be held with one edge firmly engaging one edge of said slide. Therefore a resilient member 23 has been provided in one of said grooves which yieldingly engages the side of said scale adjacent said groove and positions said slide transversely thereof. Said member 23 is in the form of a spring which is bent at opposite ends to form hooks 24 which hook over the opposite ends of said slide to maintain said resilient member in place when the scale is removed. The resilient member 23 is bowed midway of the ends thereof at 25 and engages the adjacent edge of the scale at this point, thereby forcing the scale toward and into the opposite groove and against the opposite edge of said slide 7, always maintaining said slide parallel with said scale, and with the projections 11 and 12 in their correct relations to their respective graduations on the scale 6.

As hereinbefore stated, the clamping member 14 is provided with projections 15 which are preferably formed integral with said clamping member and extend outwardly from opposite edges thereof. These projections are adapted to fit the holes 16 formed in the ears 17. To assist in assembling the clamping member 14 between the ears 17, said clamping member is slit at 27 for the greater portion of its length from the end thereof at which said projections 15 are located toward the free end 19 thereof, permitting the two portions of said clamping member formed by said slit 27 to be sprung together to permit said projections to enter the holes 16 without necessitating the springing out of the ears 17.

Having thus described my invention, what I claim and desire by Letters Patent to secure is:

1. The combination with a scale of a movable member mounted to slide longitudinally of said scale, a pair of ears on said movable member, a clamping member pivoted between said ears adapted to be moved to clamp said movable member to said scale, and a spur on said clamping member constructed and arranged to attach said movable member and scale to the edge of a piece of sheet material.

2. A gage for scales and the like having, in combination, a slide arranged on said scale to move longitudinally thereof, a clamping member pivotally mounted upon said slide and constructed and arranged to clamp said slide in a predetermined position on said scale, and a spur arranged adjacent to the free end of said clamping member adapted to be moved by the clamping movement of said clamp to secure said slide to a support.

3. A gage for scales and the like having, in combination, a slide formed of sheet material bent to form grooves adapted to receive opposite edges of a scale, means on said slide adapted to coöperate with the graduations on said scale to determine measurements, means on said slide adapted to yieldingly engage one side of said scale to retard the movements of said slide on said scale, and a lever pivoted upon said slide and independent of said retarding means adapted to engage the same side of said scale as is engaged by said retarding means to clamp said slide to said scale.

4. A gage for scales and the like having, in combination, a slide formed of sheet material bent to form grooves adapted to receive opposite edges of a scale, said slide having holes formed therein, means on said slide constructed and arranged to coöperate with the graduations on said scale to determine measurements, a pair of ears formed integral with said slide, a clamping member pivotally secured between said ears having one end arranged to engage said scale and secure said slide thereto, and spurs formed adjacent to the opposite end of said clamping member adapted to project into the holes formed in said slide, said spurs being constructed and arranged to secure said gage to a piece of sheet material.

5. A gage for scales and the like having, in combination, a slide arranged on said scale to move longitudinally thereof, a pair of ears on said slide, a clamping member provided with laterally disposed projections formed integral with said clamping member and in pivotal engagement with said ears, said clamping member being slit lengthwise thereof between said projections adapted to permit the portion of said clamping member bearing said projections to be retracted and expanded during the assembling of said gage.

In testimony whereof I have hereunto set my hand in presence of two subscribing witnesses.

FRANK DE ROY.

Witnesses:
SYDNEY E. TAFT,
MARGARET E. HORN.

Copies of this patent may be obtained for five cents each, by addressing the "Commissioner of Patents, Washington, D. C."